(12) United States Patent
Bravo et al.

(10) Patent No.: US 8,256,240 B2
(45) Date of Patent: Sep. 4, 2012

(54) DEVICE FOR THE PREPARATION AND DISTRIBUTION OF COLD PRODUCTS

(75) Inventors: Genesio Bravo, Alte Ceccato (IT); Stefano Bravo, Alte Ceccato (IT)

(73) Assignee: G.S.G. S.r.l, Vicenza (IT)

( * ) Notice: Subject to any disclaimer, the term of this patent is extended or adjusted under 35 U.S.C. 154(b) by 696 days.

(21) Appl. No.: 12/312,018

(22) PCT Filed: Dec. 14, 2007

(86) PCT No.: PCT/IB2007/004015
§ 371 (c)(1),
(2), (4) Date: Apr. 22, 2009

(87) PCT Pub. No.: WO2008/075190
PCT Pub. Date: Jun. 26, 2008

(65) Prior Publication Data
US 2010/0050655 A1    Mar. 4, 2010

(30) Foreign Application Priority Data

Dec. 19, 2006  (IT) .............................. MI2006A2430

(51) Int. Cl.
*A23G 9/00* (2006.01)
(52) U.S. Cl. ........................................................ 62/342
(58) Field of Classification Search ................... 62/342, 62/68, 337
See application file for complete search history.

(56) References Cited

U.S. PATENT DOCUMENTS 3,050,960 A    8/1962   Fitzsimon
4,463,572 A *  8/1984   Brown, Jr. ........................ 62/135

FOREIGN PATENT DOCUMENTS

| EP | 0 M521 575 A | 1/1993 |
| EP | 0 728 417 A | 8/1996 |
| WO | WO 88/01473 A | 10/1988 |

OTHER PUBLICATIONS

PCT Search Report dated Jun. 10, 2008.

* cited by examiner

*Primary Examiner* — Melvin Jones
(74) *Attorney, Agent, or Firm* — Hedman & Costigan, P.C; James V. Costigan

(57) ABSTRACT

A device for the production and distribution of cold products, in particular for machines for the production of soft ice-cream, comprises a cylindrical chamber (12) equipped at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17). According to the invention, said extraction tap (14) is positioned on a closing flange (21) of said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap (14).

6 Claims, 3 Drawing Sheets

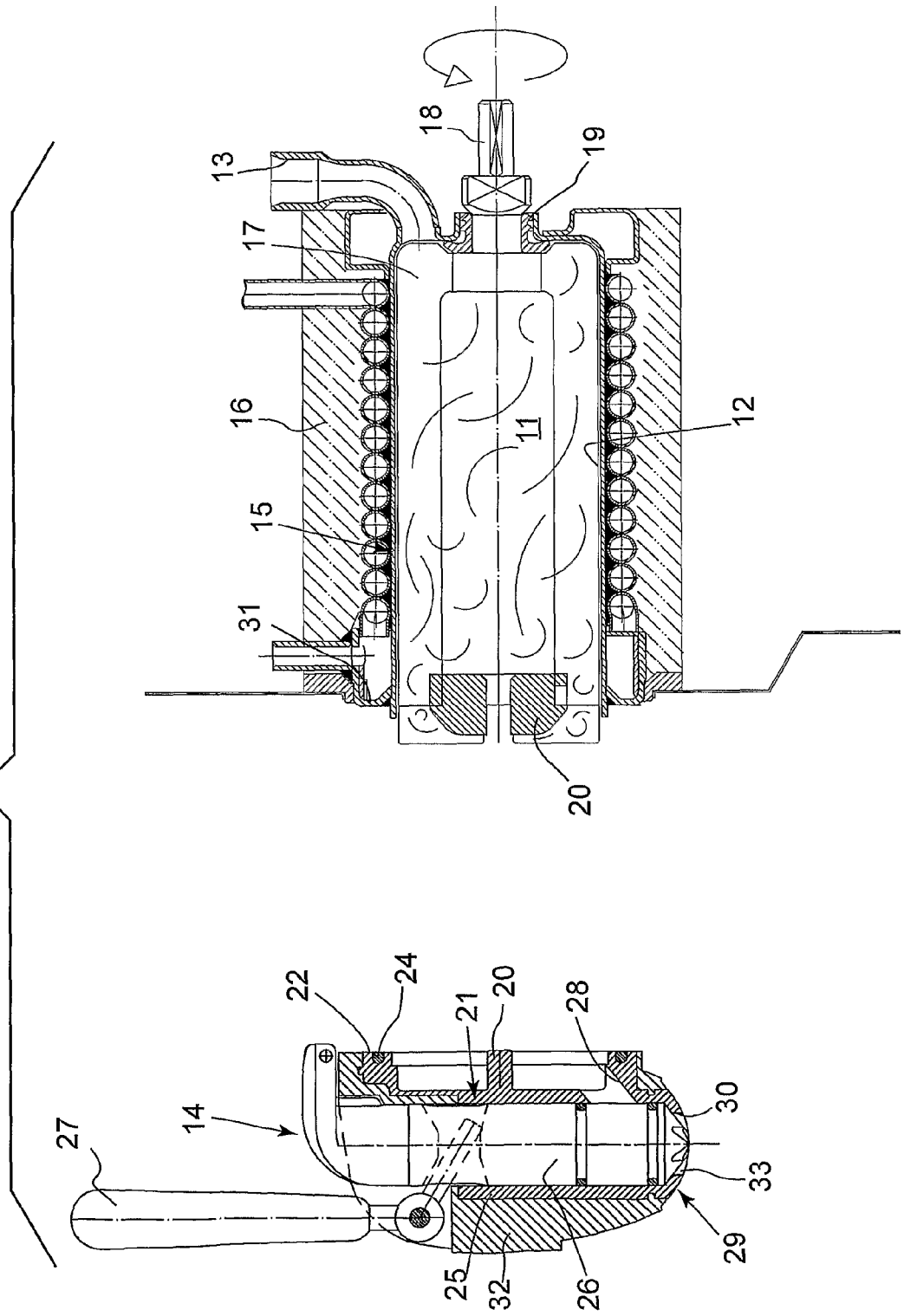

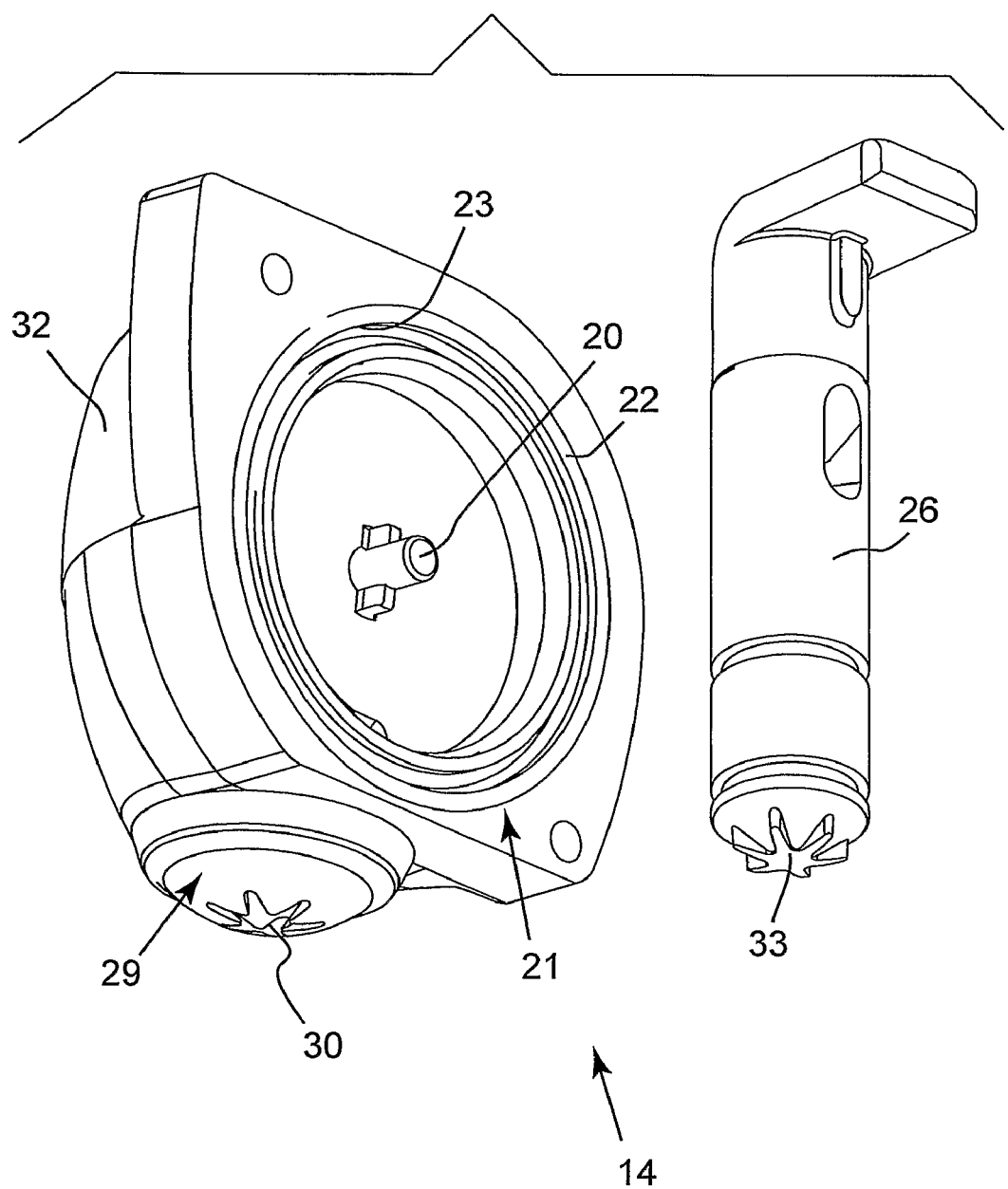

DEVICE FOR THE PREPARATION AND DISTRIBUTION OF COLD PRODUCTS

The present invention relates to a device for the preparation and distribution of cold products, more specifically, for machines for the production of soft ice-cream.

Machines for the production of so-called soft ice-cream, as also machines for the production of whipped cream, are equipped with a cooled cylindrical chamber for the preparation of the cold food product, and a distribution beak of the product itself, which must be preserved at +4° C.

In the known machines present on the market for the production of soft ice-cream, the distribution beak is always exposed to room temperature.

The beak itself is made of plastic material, and this causes the deterioration of residues of the food product inevitably remaining attached to the tip of the beak after the distribution of the portion of soft ice-cream.

Only in some cases is there a lid made of plastic material, which acts as a protection from dust and parasites present on the beak. This protection, however, does not satisfy effective hygiene requirements, as the closure is not hermetic and the closing and opening of said lid are left to the free decision of the operator.

A general objective of the present invention is therefore to solve the drawbacks mentioned above of the known art in a simple, economical and particularly functional manner.

A further objective is to provide a device for the preparation and distribution of cold products, which guarantees the preservation of all the parts of the product, also those residual parts which inevitably remain on the distribution beak.

In view of the above objectives, according to the present invention, a device has been conceived for the preparation and distribution of cold products, in particular for machines for the production of soft ice-cream, having the characteristics specified in the enclosed claims.

The structural and functional characteristics of the present invention and its advantages with respect to the known art will appear more evident from the following description, referring to the enclosed drawings, which show a device for the preparation and distribution of cold products produced according to the innovative principles of the invention itself.

In the drawings:

FIG. 3 shows an exploded view of the device of FIG. 2;

FIG. 4 is a perspective view of the exploded extraction tap.

Figure 1:
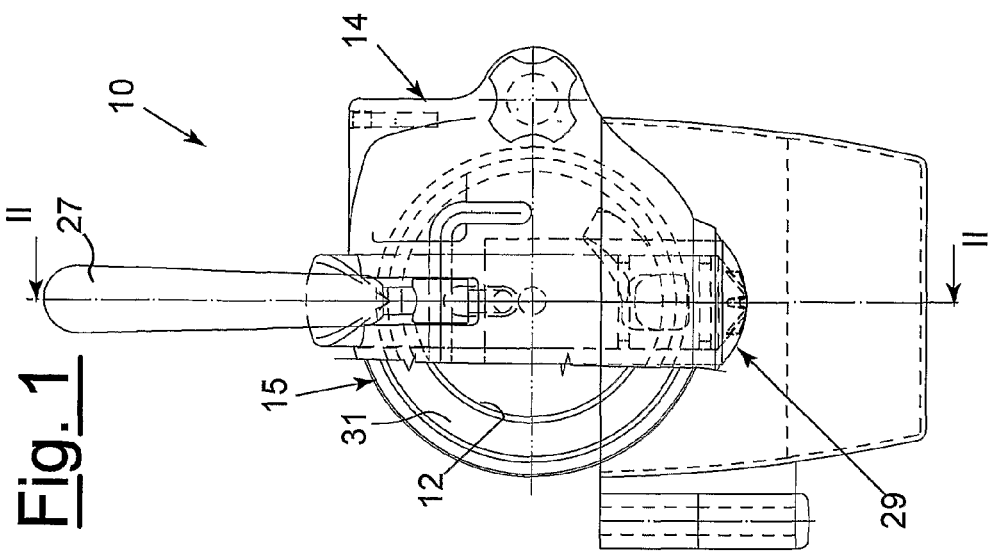
FIG. 1 shows a partial cross-section front view of a device for the preparation and distribution of cold products, in particular for soft ice-cream machines, of the present invention.
Figure 2:
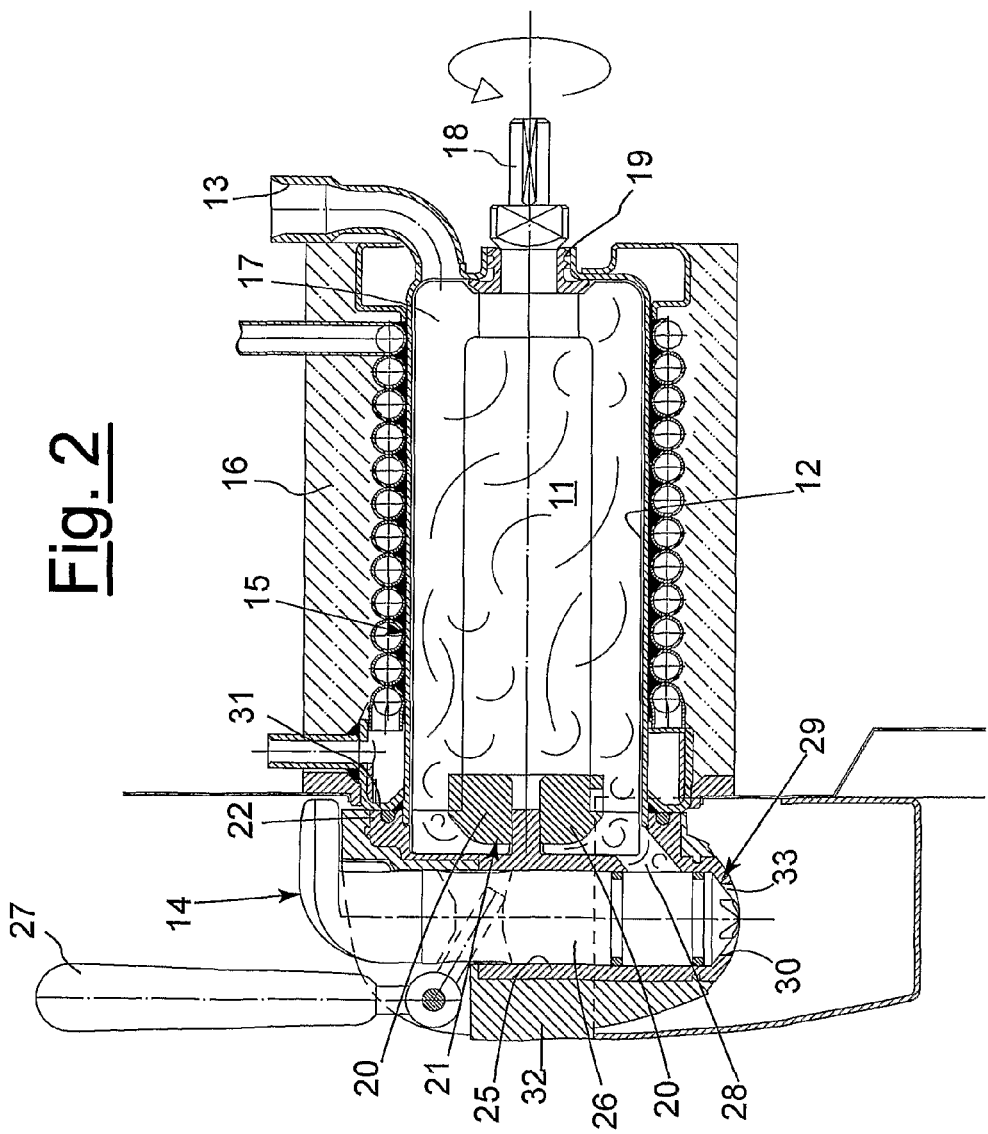
FIG. 2 is a sectional view according to the trace II-II of the device of FIG. 1.

With reference to the drawings, a device for the preparation and distribution of cold products, in particular for machines for the production of soft ice-cream, in question, is indicated as a whole with 10, and in the example illustrated, according to the present invention, comprises a cylindrical chamber 12 equipped, at one end, with an inlet mouth 13 for a liquid food mixture 11 and, at an opposite end, an extraction tap 14 for the distribution of the cold food product.

The cylindrical chamber 12 is externally enveloped by an evaporator group, stably positioned on the machine for the production of soft ice-cream, not shown.

The evaporator group comprises an evaporation chamber 15 where cold air is generated, situated directly in contact with the wall of the cylindrical chamber 12 and externally enveloped by an insulating casing 16.

Inside the cylindrical chamber 12, there is a mixer 17, for example for whipping ice-cream in the cylinder during cooling.

The mixer 17 comprises, at one end, an entrainment shaft 18 equipped with a sealing ring 19 which forms a rotating seal on the cylindrical chamber 12.

The opposite end of the mixer 17 and a closing flange 21 of the cylindrical chamber 12 have centering means 20, for example a ferrule coupled with a pin of the flange, suitable for allowing the rotation of the mixer 17 itself with respect to the flange 21.

The closing flange 21 is made of an atoxic metallic material with a high thermal conductivity and comprises an annular wall 22 equipped with an annular cavity 23 for a sealing ring 24. The flange 21 also comprises a housing 25 for the opening and closing organs of a nozzle 29 equipped with a shaped hole 30. In the example illustrated, the housing 25, which is cylindrically shaped, acts as a guide for the axial sliding of a piston 26, activated by a lever 27, which opens and closes a distribution span of the product 28 towards the nozzle 29.

The annular wall 22 effects thermal exchange with the evaporator, i.e. with a front annular wall 31 of the evaporation chamber 15, complementary to the annular wall 22 of the flange 21 and, by thermal conductivity, through the cylindrical housing 25 of the piston 26, it brings the distribution tap 14 to a temperature of about +4° C.++6° C.

When the flange 21 is assembled, in fact, the complementary annular surfaces are in contact with each other and, by natural conduction of cold air, the flange 21, i.e. its metallic component, also absorbs the cold bringing it to all the parts in thermal contact with it.

The distribution tap 14, which can be dismantled with respect to the cylindrical chamber 12, is equipped on the side opposite to that facing the cylindrical chamber 12 with a coating of plastic material 32 for thermal insulation from the outside environment of the metallic flange 21.

Furthermore, the piston 26 comprises, at the lower end, a protruding closing element 33, complementary to the hole 30 of the nozzle 29, and suitable for being inserted in said hole 30 in a rest position. The stagnant space of the ice-cream is therefore annulled and a greater hygiene of the distributed product is consequently obtained.

With respect to what is specified above, in the device for the production and distribution of cold products, according to the present invention, as the evaporation temperature of the cooling gas inside the evaporator is about −18° C.+−20° C., the final temperature of the distribution tap 14 is also extremely low, i.e. close to 0° C., thus guaranteeing the preservation of the product 11 present.

Furthermore, the food product 11 itself, present inside the cylindrical chamber 12, partly contributes to the cooling of the distribution tap 14 by yielding part of its cold to the flange 21 made of metallic material. This cooling effect, however, is not a determinant component as the ice-cream is extracted at a temperature of −8° C. and it would not be sufficient for bringing the distribution tap 14 to +4° C.++6° C.

With the device for the preparation and distribution of cold products 10, object of the present invention, a temperature of the product ranging from +4° C.++8° C. is advantageously guaranteed as far as the outlet end of the product, ensuring a continuous hygiene of the product distributed.

From the above description with reference to the figures, it is evident that a device for the production and distribution of cold products, in particular for machines for the production of soft ice-cream according to the invention is particularly useful and advantageous. The objective specified in the preamble of the description is therefore achieved.

The forms of the device for the production and distribution of cold products, in particular for machines for the production of soft ice-cream, according to the invention, as also the materials used, can obviously differ from those shown for illustrative and non-limiting purposes in the drawings.

The protection scope of the invention is therefore delimited by the enclosed claims

The invention claimed is:

1. A device for the production and distribution of cold products, in particular for machines for the production of soft ice-cream, comprising a cylindrical chamber (12) equipped at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17), characterized in, that said extraction tap (14) is positioned on a closing flange (21) of, said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap (14) wherein said housing (25) of the opening or closing organs of a nozzle (29) is a cylindrical housing (25) for the axial sliding of a piston (26) of said distribution tap (14).

2. A device for the production and distribution of cold products, in particular for machines for the production of soft ice-cream, comprising a cylindrical chamber (12) equipped at one end with an inlet mouth (13) for a liquid food mixture and at an opposite end with an extraction tap (14) for the distribution of the cold food product, wherein said cylindrical chamber (12) is externally by an evaporation (15) for the cooling of the liquid food mixture and contains in its interior a mixer (17), characterized in that said extraction tap (14) is positioned on a closing flange (21) of said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap (14) wherein said tap (14) comprises, on the side opposite to that facing the cylindrical chamber (12), a coating of plastic material (32) suitable for thermally insulating the metallic flange (21) from the outside environment.

3. A device for the production and distribution of cold products, in particular for machines for the production of soft ice-cream, comprising a cylindrical chamber (12) equipped at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17), characterized in that said extraction tap (14) is positioned on a closing flange (21) of said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap (14) wherein said piston (26) comprises, at the lower end, a protruding closing element (33), complementary to the hole (30) of said nozzle (29), and suitable for being inserted in said hole (30) in a rest position.

4. A device for the production and distribution of cold products, in particular for machines for the production of soft ice-cream, comprising a cylindrical chamber (12) equipped at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17), characterized in that said extraction tap (14) is positioned on a closing flange (21) of said cylindrical chamber (12), wherein said flange (21) comprises an annular wall (22), which can be complementarily coupled with a front annular wall 31 of said evaporation chamber (15), and a housing (25) of the opening and closing organs of a nozzle (29), wherein said annular wall (22) and said housing (25) are made of a metallic material and put in thermal contact with each other for the cooling of the extraction tap (14) wherein said evaporation chamber (15) is put directly in contact with the wall of said cylindrical chamber (12) and is externally enveloped by an insulting casing (16).

5. A device for the production and distribution of cold products, in particular for machines for the production of soft ice-cream, comprising a cylindrical chamber (12) equipped at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17), characterized in that said extraction tap (14) is positioned on a closing flange (21) of said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap (14) wherein said mixer (17) comprises, at one end, an entrainment shaft (18), equipped with a sealing ring (19) which forms a rotating seal on the cylindrical, chamber (12).

6. A device for the production and distribution of cold products, in particular for machines for the production of soft ice-cream, comprising a cylindrical chamber (12) at one end with an inlet mouth (13) for a liquid food mixture and at an opposite end with an extraction tap (14) for the distribution of the cold food product, wherein said cylindrical chamber (12) is externally enveloped by an evaporation chamber (15) for the cooling of the liquid food mixture and contains in its interior a mixer (17), characterized in that said extraction tap (14) is positioned on a closing flange (21) of said cylindrical chamber (12), wherein said flange (21) comprises an annular wall (22), which can be complementarily coupled with a front annular wall (31) of said evaporation chamber (15), and a housing (25) of the opening and closing organs of a nozzle (29), wherein said annular wall (22) and said housing (25) are made of a metallic material and put in thermal contact with each other for the cooling of the extraction tap 14 wherein said mixer comprises, at an opposite end, a centering means (20) on said closing flange (21) of the cylindrical chamber (12) suitable for allowing the rotation of the mixer (17) itself with respect to the flange (21).

* * * * *